United States Patent
Asano et al.

(10) Patent No.: US 8,773,708 B2
(45) Date of Patent: Jul. 8, 2014

(54) IMAGE FORMING APPARATUS AND METHOD OF CONTROLLING THE APPARATUS

(75) Inventors: Kohei Asano, Yokohama (JP); Keishi Inaba, Yokohama (JP); Koji Shimizu, Tokyo (JP); Kiyokazu Umimura, Kawasaki (JP); Yuji Naya, Kawasaki (JP); Yuichi Konosu, Saitama (JP)

(73) Assignee: Canon Kabushiki Kaisha (JP)

( * ) Notice: Subject to any disclaimer, the term of this patent is extended or adjusted under 35 U.S.C. 154(b) by 128 days.

(21) Appl. No.: 13/449,959

(22) Filed: Apr. 18, 2012

(65) Prior Publication Data

US 2012/0268790 A1 Oct. 25, 2012

(30) Foreign Application Priority Data

Apr. 20, 2011 (JP) ................. 2011-094373
Apr. 3, 2012 (JP) ................. 2012-084702

(51) Int. Cl.
 *G06F 15/00* (2006.01)
(52) U.S. Cl.
 USPC ........................................................ 358/1.16
(58) Field of Classification Search
 USPC ........................................................ 358/1.16
 See application file for complete search history.

(56) References Cited

U.S. PATENT DOCUMENTS

2011/0205581 A1* 8/2011 Machii et al. ................ 358/1.15

FOREIGN PATENT DOCUMENTS

JP 2004-262065 A 9/2004

* cited by examiner

*Primary Examiner* — Saeid Ebrahimi Dehkordy
(74) *Attorney, Agent, or Firm* — Rossi, Kimms & McDowell LLP (57) ABSTRACT

An image forming apparatus according to the present invention is capable of connecting a removable storage device that stores operation data controlling an operation of the image forming apparatus. When a shutdown instruction of the image forming apparatus is received from a user, it is determined whether or not it is necessary to execute an operation using the operation data stored in the removable storage device. In a case that it is determined that it is necessary to execute an operation using the operation data, the image forming apparatus stores the operation data stored in the removable storage device into an incorporated non-volatile storage unit and shuts down, and then restart. After the restart is performed, it is controlled so that an operation using the operation data that has been stored in the incorporated non-volatile storage unit is executed.

6 Claims, 6 Drawing Sheets

FIG. 6

IMAGE FORMING APPARATUS AND METHOD OF CONTROLLING THE APPARATUS

BACKGROUND OF THE INVENTION

1. Field of the Invention

The present invention relates to an image forming apparatus including a removable storage device, and a method of controlling the apparatus.

2. Description of the Related Art

Conventionally, there have been image forming apparatuses that perform sufficient cooling or periodic cleaning for maintaining high-speed and high-precision printing quality.

Further, there have been image forming apparatuses comprising a hard disk drive (HDD) that serves as a rewritable storage device. Such an image forming apparatus stores, in the HDD, data for starting up an operating system (OS). The HDD is used not only at the time of start-up, but also at the time of temporary storage of image data or storage of user data. Moreover, there have been image forming apparatuses having a mechanism (removable mechanism) for enabling a user to remove a HDD from a main bode of the apparatus, for a case where highly confidential user data is stored in the HDD.

Japanese Patent Laid-Open No. 2004-262065 discloses a power supply control method of a HDD in an image forming apparatus including a HDD.

In the conventional image forming apparatus, there are following problems. When a user attempts to remove a removable storage device, if an image forming apparatus is performing processing with the use of data stored in the removable storage device, the user is unable to remove the removable storage device until the processing ends. If the processing is forcibly terminated, the storage device can be immediately removed. However, such a forcible termination of the processing causes another problem. For instance, in a case where processing such as cooling or cleaning is being performed, if the processing is forcibly terminated, performance of the image forming apparatus or quality of formed images deteriorates. Meanwhile, because the processing uses data stored in the storage device, the processing cannot be performed again after the storage device is removed.

SUMMARY OF THE INVENTION

An aspect of the present invention is to eliminate the above-mentioned problems with the conventional technology.

The feature of the present invention is to provide a technique that enables immediate removal of a removable storage device from an image forming apparatus main unit in response to a termination instruction of the image forming apparatus, without causing a trouble in an operation using data in the removable storage device, even in a case where it is necessary to execute an operation using operation data stored in the removable storage device.

According to an aspect of the present invention, there is provided an image forming apparatus capable of connecting a removable storage device that stores operation data controlling an operation of the image forming apparatus, the apparatus comprising: a determination unit configured to determine, in a case that a shutdown instruction of the image forming apparatus is received from a user, whether or not it is necessary to execute an operation using the operation data stored in the removable storage device; a restarting unit configured to save the operation data stored in the removable storage device into an incorporated non-volatile storage unit and to shut down the image forming apparatus, and then restart the image forming apparatus, in a case that it is determined by the determination unit that it is necessary to execute an operation using the operation data; and a control unit configured to control so that, after a restart is performed by the restarting unit, an operation using the operation data that has been stored in the incorporated non-volatile storage unit is executed.

According to another aspect of the present invention, there is provided a control method of an image forming apparatus capable of connecting a removable storage device that stores operation data controlling an operation of the image forming apparatus, the method comprising: a determination step of determining, in a case that a shutdown instruction of the image forming apparatus is received from a user, whether or not it is necessary to execute an operation using the operation data stored in the removable storage device; a restarting step of saving the operation data stored in the removable storage device into an incorporated non-volatile storage unit and shutting down the image forming apparatus, and then restarting the image forming apparatus, in a case that it is determined in the determination step that it is necessary to execute an operation using the operation data; and a control step of controlling so that, after a restart is performed in the restarting step, an operation using the operation data that has been stored in the incorporated non-volatile storage unit is executed.

Further features and aspects of the present invention will become apparent from the following description of exemplary embodiments, with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Embodiments of the present invention will be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

First Embodiment

Figure 1:
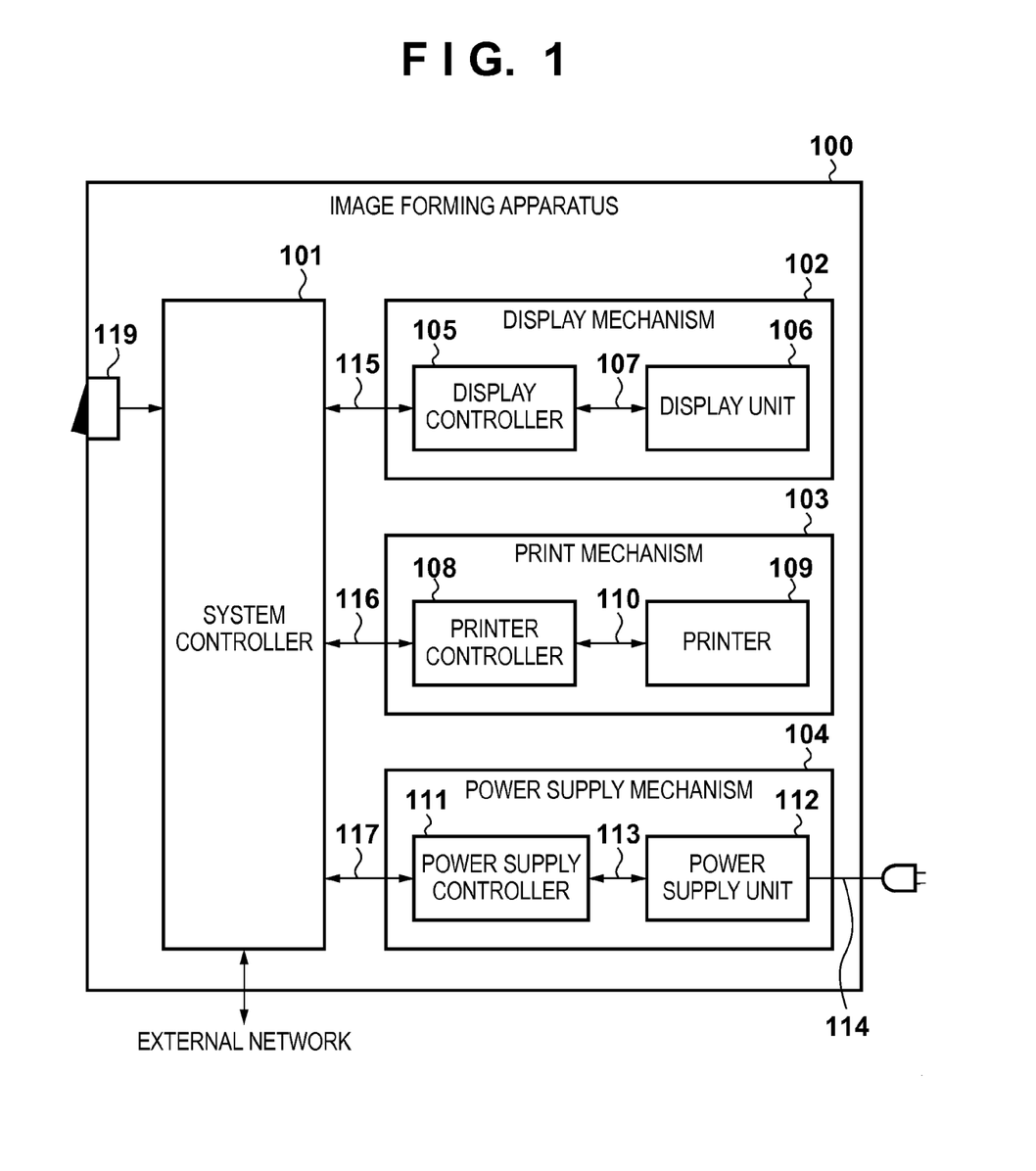
FIG. 1 is a block diagram showing an overall configuration of an image forming apparatus.

FIG. 1 shows a configuration of an image forming apparatus 100. The image forming apparatus 100 comprises a system controller 101, a display mechanism 102, a print mechanism 103, a power supply mechanism 104, and a power supply switch 119.

The system controller 101 is connected to the display mechanism 102, the print mechanism 103, the power supply mechanism 104, and the power supply switch 119, and performs overall control of the image forming apparatus 100. The internal configuration of the system controller 101 will be described later with reference to FIG. 2.

The display mechanism 102 comprises a display controller 105 and a display unit 106. The display unit 106 has a liquid crystal panel or the like for displaying a status of the image forming apparatus and informing a user of the status. The display unit 106 also has a user instruction input unit (not shown) (a touch panel sheet pasted on the liquid crystal panel and other hard keys) for receiving information such as the number of printing, print setting, or the like. The display controller 105 is connected to the display unit 106 through a control line 107, comprises an independent CPU (not shown), and performs control for rendering data to be displayed on the display unit 106 and recognizing a user instruction received by the display unit 106. The display controller 105 is also connected to the system controller 101 through a control line 115 for receiving rendering data transmitted by the system controller 101 or transmitting a recognized user instruction to the system controller 101. The CPU (not shown) of the display controller 105 does not depend on the system controller 101, and is capable of an independent operation.

The print mechanism 103 comprises a printer controller 108 and a printer 109. The printer 109 includes a printing unit (not shown) for performing printing on paper according to print data, and a paper conveyance unit (not shown) for conveying paper. The printer 109 also includes a cooling mechanism (not shown) and a cleaning mechanism (not shown) for maintenance of the aforementioned units. The printer controller 108 is connected to the printer 109 through a control line 110, comprises an independent CPU (not shown), and performs control of the printer 109 such as control of print data to be printed by the printer 109, paper-feed control, cleaning, and cooling. The printer controller 108 is also connected to the system controller 101 through a control line 116 for receiving print data transmitted by the system controller 101 or transmitting a status of the printer 109 to the system controller 101. The CPU (not shown) of the printer controller 108 does not depend on the system controller 101, and is capable of an independent operation.

The power supply mechanism 104 comprises a power supply controller 111 and a power supply unit 112. The power supply unit 112 includes a power supply line 114 connected to a commercial power source, a transformer (not shown) for transforming power obtained by the power supply line 114, and an AC/DC converter (not shown) for converting transformed power to a direct current. The power supply controller 111 is connected to the power supply unit 112 through a control line 113. The power supply controller 111 also controls electric power generated by the power supply unit 112, and controls electric power supplied to respective units of the image forming apparatus 100, such as the system controller 101, print mechanism 103, and the like. The power supply controller 111 is also connected to the system controller 101 through a control line 117, and supplies power to or stops power supply to respective units of the image forming apparatus 100 according to an instruction of the system controller 101.

The power supply switch 119 is operated when a user wants to turn on or off the power of the image forming apparatus 100. The power supply switch 119 is connected not to the power supply mechanism 104, but to the system controller 101; therefore, even if the power supply switch 119 is turned off, the power of the image forming apparatus 100 is not immediately turned off. More specifically, when the system controller 101 detects that the power supply switch 119 is turned off, the system controller 101 controls the power supply controller 111 through the control line 117 to stop power supply from the power supply mechanism 104 to respective units of the image forming apparatus 100.

Figure 2:
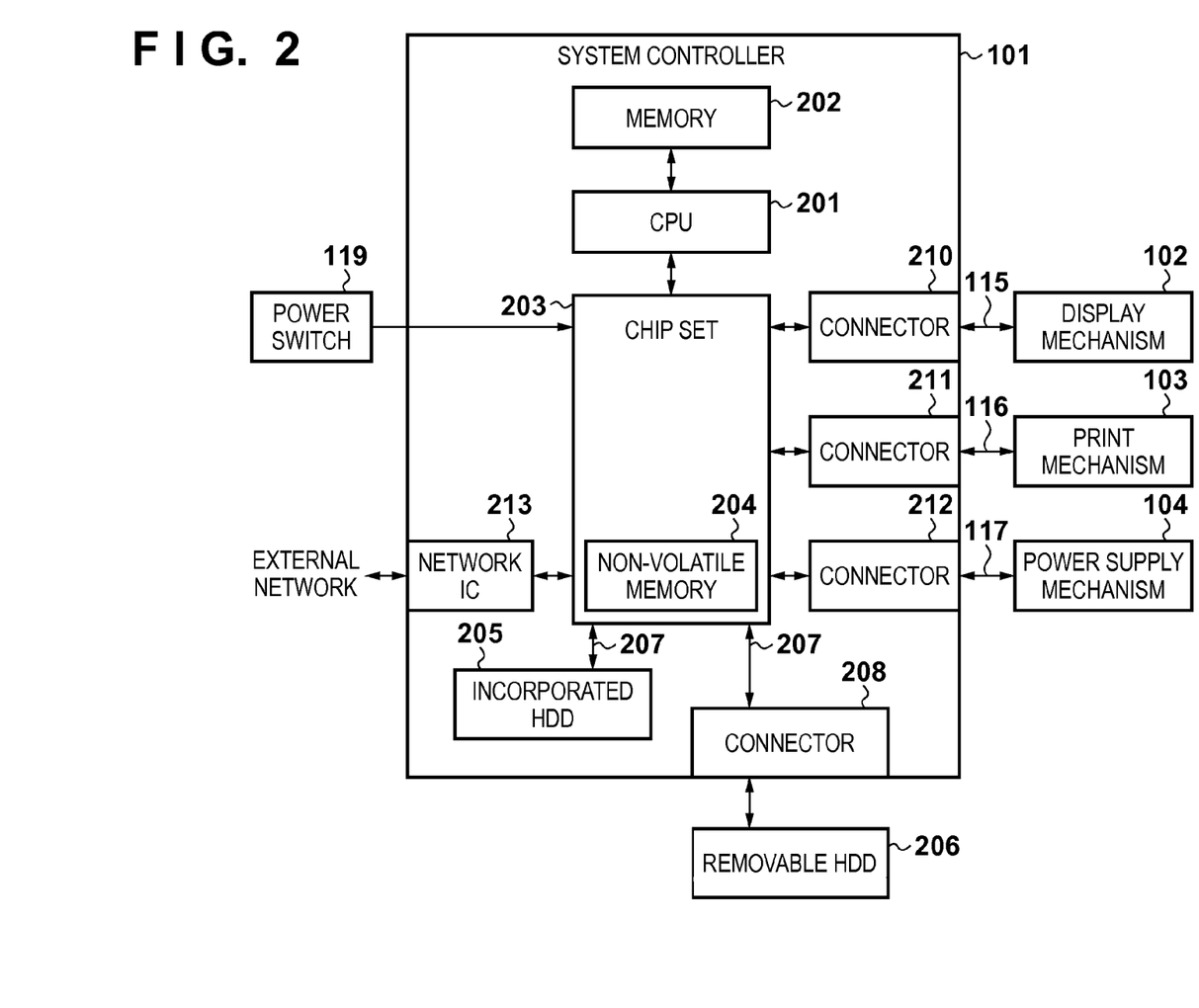
FIG. 2 is a block diagram showing a detailed configuration of a system controller of the image forming apparatus.

FIG. 2 shows a detailed internal configuration of the system controller 101. The units common to that of FIG. 1 are referred to by the same numerals. The system controller 101 comprises a CPU 201, a memory 202, a chip set 203, an incorporated HDD 205, a network IC 213, a connector 208 for connecting a removable HDD 206, and connectors 210 to 212 for connecting respective mechanisms 102 to 104 shown in FIG. 1.

The removable HDD 206 and the incorporated HDD 205 are a non-volatile storage device, which provides data necessary for the system controller 101 to start up. They can also store arbitrary user data in accordance with a user instruction. The incorporated HDD 205 cannot easily be removed as the removable HDD 206 can. To the removable HDD 206 and the incorporated HDD 205, common electric power is supplied from the power supply mechanism 104 through the chip set 203.

The connector 208 removably connects the removable HDD 206. The HDD 206 is standardized by iVDR (Information Versatile Disk for Removable usage).

Note that because the present embodiment assumes use of a HDD as a removable storage device, the connector 208 and the removable HDD 206 are employed. Besides those mentioned above, a USB connector and a USB memory may be adopted, or a storage medium such as CD, DVD or the like, and a slot for inserting the storage medium may be adopted.

The CPU 201 performs overall control of the image forming apparatus 100 using an OS, and generates print data to be printed by the print mechanism 103 and screen data to be displayed by the display mechanism 102.

The chip set 203 is an I/O controller for connecting the system controller 101 to an external interface. More specifically, the chip set 203 is connected to the display mechanism 102, the print mechanism 103, and the power supply mechanism 104 respectively through the connectors 210 to 212, and performs control of the respective connected units using the CPU 201. Also, the chip set 203 is connected to the removable HDD 206 and the incorporated HDD 205 through dedicated buses 207 such as a serial ATA (Advanced Technology Attachment), and controls data reading or writing in the removable HDD 206 and the incorporated HDD 205 using the CPU 201. The chip set 203 is also connected to the network IC 213 for controlling an access of the CPU 201 to a network. The chip set 203 further comprises a general-purpose I/O pin, which is connected to the power supply switch 119, and transmits an on/off state of the power supply switch 119 to the CPU 201. The chip set 203 further comprises a non-volatile memory 204 which stores data even if power supply is cut off. The non-volatile memory 204, such as a flash memory, stores data that is essential for start-up.

The memory 202, which is directly connected to the CPU 201, is controlled by a memory controller (not shown) in the CPU 201. The memory 202, such as a RAM, is used as an area for developing various application programs executed by the CPU 201, and generating rendering data to be transmitted to the display mechanism 102 or print data to be transmitted to the print mechanism 103.

Figure 3:
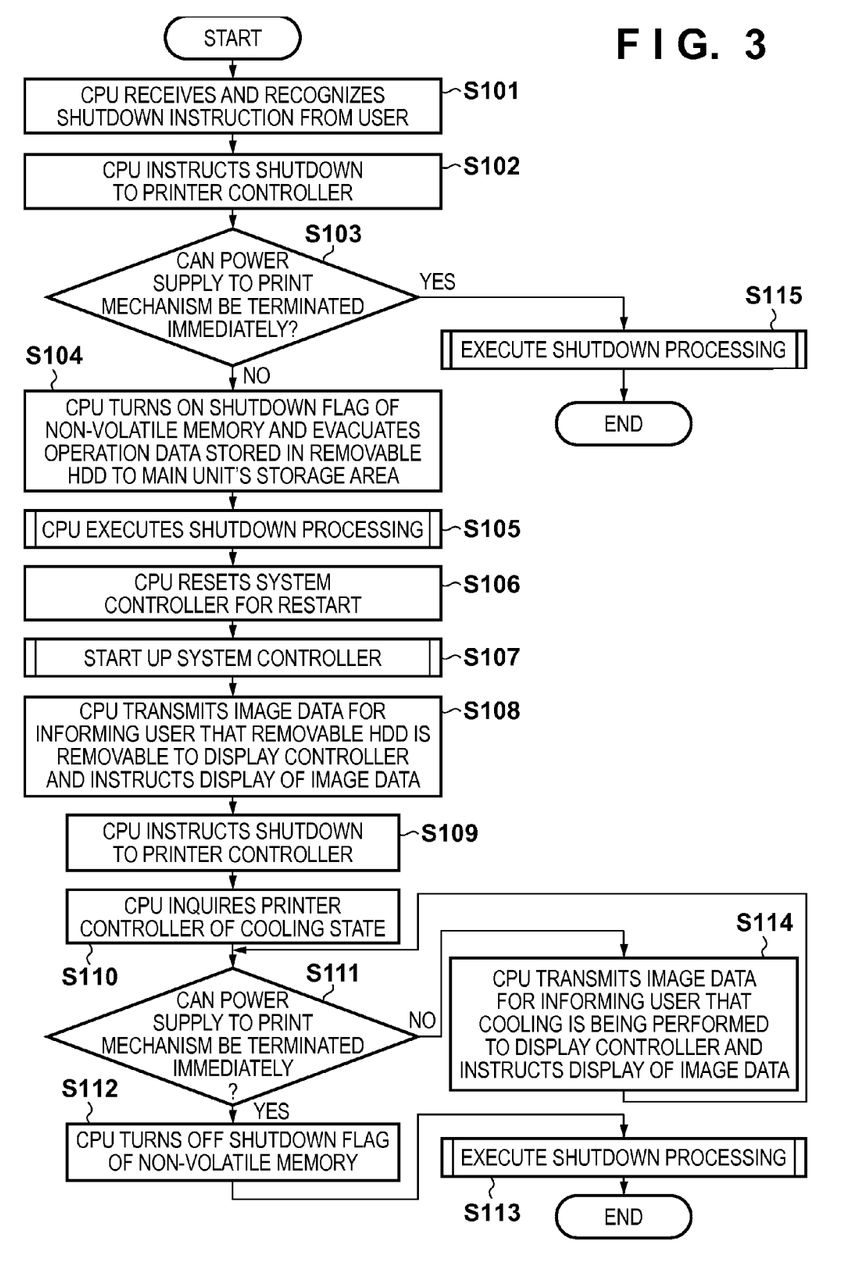
FIG. 3 is a flowchart for describing an overall processing procedure of the system controller.
Figure 4:
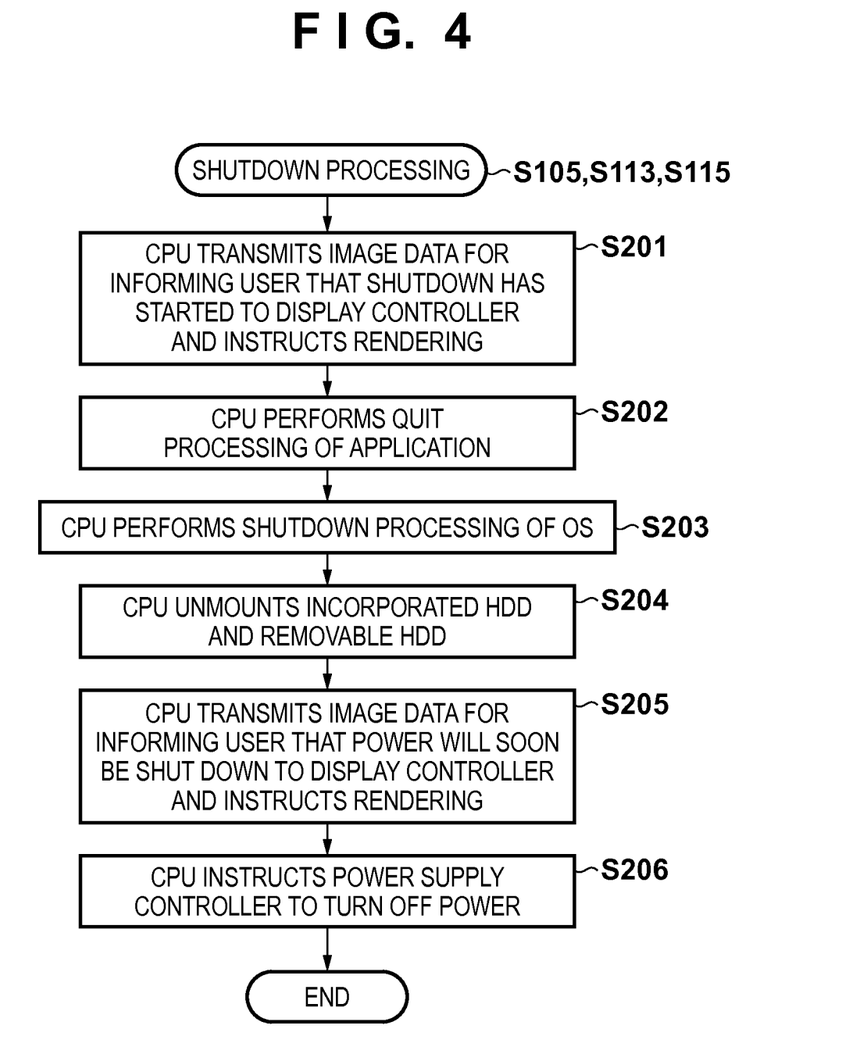
FIG. 4 is a flowchart for describing a detailed processing procedure of shutdown processing.
Figure 5:
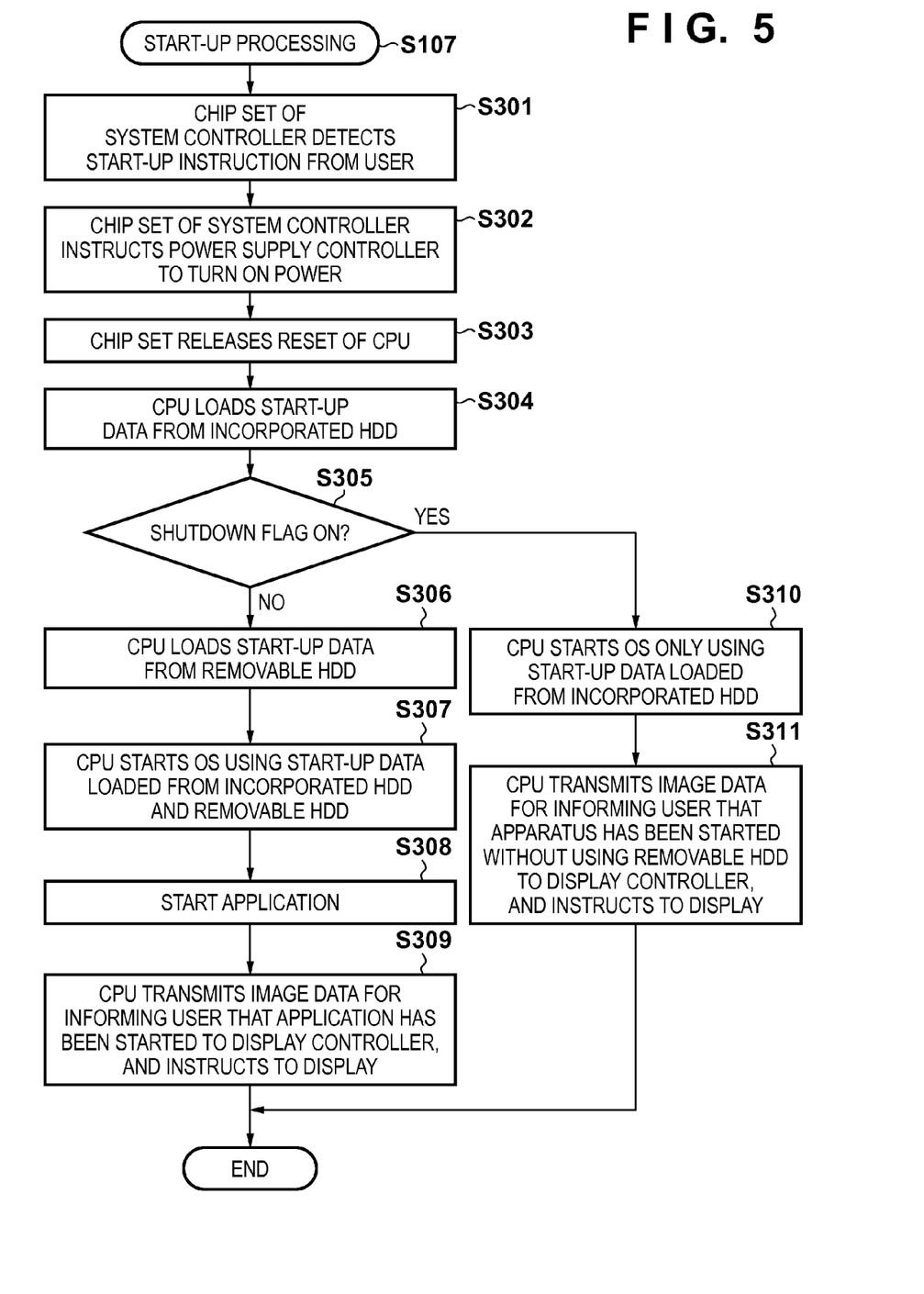
FIG. 5 is a flowchart for describing a detailed processing procedure of start-up processing according to the first to third embodiments.

The following description is provided with reference to the flowcharts in FIGS. 3 to 5.

FIG. 3 is a flowchart for describing overall processing of the image forming apparatus 100 according to the present embodiment. Note that a program realizing this processing is developed in the memory 202 and executed under the control of the CPU 201.

In step S101, when a user turns off the power supply switch 119 to instruct shutdown of the entire image forming apparatus 100 being operated, the CPU 201 receives and recognizes the shutdown instruction through the chip set 203. In step S102, the CPU 201 outputs a shutdown instruction to the printer controller 108. In step S103, the CPU 201 inquires the printer controller 108 of the print mechanism 103 through the chip set 203 as to whether or not power supply to the print mechanism 103 can immediately be terminated, and obtains a response. In other words, the CPU 201 inquires the printer controller 108 of the print mechanism 103 through the chip set 203 as to whether or not cooling of the print mechanism 103 needs to be performed before turning off the power, and obtains a response. The printer controller 108, for instance, may measure a temperature of a fixing unit or the like by a temperature sensor, and make determination that cooling is necessary if the measured temperature exceeds a predetermined value.

If the power supply to the print mechanism 103 can immediately be terminated, in step S115, the CPU 201 executes shutdown processing by the system controller 101 to turn off the power of the entire image forming apparatus 100. The shutdown processing of the system controller 101 in step S115 will be described later in detail with reference to FIG. 4.

Meanwhile, if the power supply to the print mechanism 103 cannot be immediately terminated, in step S104, the CPU 201 turns on a shutdown flag in the non-volatile memory 204 of the chip set 203. The CPU 201 then evacuates operation data, stored in the removable HDD 206, to a non-volatile memory of the image forming apparatus 100. For instance, the shutdown flag of the non-volatile memory 204 is, for instance, a control value 0 or 1, 1 being a flag-on state and 0 being a flag-off state. Also, assume that a flag-off state (0) is set by default, and that the processing of changing the control value from 0 to 1 is performed in step S104. The operation data serves to activate functions of the image forming apparatus 100, and in the first embodiment, serves as data for performing cooling processing of the print mechanism 103. The non-volatile memory for evacuating the operation data may be the non-volatile memory 204 or the incorporated HDD 205. In step S105, the CPU 201 executes shutdown processing of the system controller 101, and in step S106 resets the system controller 101 for a restart.

In step S107, the system controller 101, which has been restarted by the reset operation, detects by a start-up sequence which will be described later with reference to FIG. 5, that the shutdown flag in the non-volatile memory 204 is ON (1), and starts up without using data stored in the removable HDD 206. In step S108, the CPU 201 generates image data for informing a user that the removable HDD 206 is in a removable state, and transmits the image data to the display controller 105 to be displayed by the display unit 106.

In step S109, when it is detected that the user has removed the removable HDD 206 in accordance with the image displayed in the display unit 106, the CPU 201 instructs shutdown again to the printer controller 108.

Thereafter, while the printer controller 108 continues cooling of the printer 109, in step S110, the CPU 201 periodically inquires the printer controller 108 regarding the cooling state of the printer 109. In step S111, when the cooling of the printer 109 has been completed and the CPU 201 receives a response from the printer controller 108 that the power supply to the print mechanism 103 can be turned off, the process proceeds to step S112. In step S112, the CPU 201 turns off the shutdown flag of the non-volatile memory 204. In step S113, shutdown processing of the system controller 101 is executed, thereby turning off the power of the image forming apparatus 100. Meanwhile, in step S111, if the cooling of the printer 109 has not been completed and the printer controller 108 returns a response that the power supply to the print mechanism 103 cannot be immediately terminated, the process proceeds to step S114. In step S114, the CPU 201 generates image data for informing the user that the print mechanism 103 is in a cooling process, and transmits the image data to the display controller 105 to be displayed by the display unit 106, and then the process advances to step S111. This loop is continued until the cooling of the print mechanism 103 is completed.

Next, details of the shutdown processing of the system controller 101, which is common in steps S105, S113, and S115, are described with reference to the flowchart in FIG. 4.

When shutdown processing is started, in step S201, the CPU 201 generates image data for informing the user that shutdown processing has started, and transmits the image data to the display controller to instruct rendering. In step S202, the CPU 201 quits an application (software) operated in the OS. In step S203, the CPU 201 starts shutdown processing of the OS and terminates various processes. In step S204, the CPU 201 unmounts, in the software, the incorporated HDD 205 and the removable HDD 206 used for starting the OS. In step S205, the CPU 201 generates image data for informing the user that electric power of the image forming apparatus 100 will soon be shut down, and transmits the image data to the display controller 105 to be displayed by the display unit 106. In this example, the unmounted HDD in steps S105 and S115 is both the incorporated HDD 205 and the removable HDD 206, but the unmounted HDD in step S113 is the incorporated HDD 205 only. In step S206, the CPU 201 instructs the power supply controller 111 to turn off the electric power of the entire image forming apparatus 100. Accordingly, the power supply controller 111 turns off the electric power of the image forming apparatus 100, thereby completing the shutdown processing.

Next, details of the start-up processing of the system controller 101 in step S107 in FIG. 3 are described with reference to the flowchart in FIG. 5.

In step S301, when the chip set 203 of the system controller 101 detects a start-up instruction from a user by the power supply switch 119, in step S302, the chip set 203 instructs the power supply controller 111 to turn on the power, thereby turning on the power of the image forming apparatus 100. In step S303, the chip set 203 releases reset of the CPU 201 for starting an operation of the CPU 201. In step S304, the CPU 201 loads data, which is necessary for initial start-up, from the incorporated HDD 205 and executes start-up processing using the data. In step S305, the CPU 201 accesses the non-volatile memory 204 of the chip set 203 to confirm a shutdown flag. If the shutdown flag is OFF (0), then the CPU 201 recognizes a normal-mode start-up and the process advances to step S306, and the CPU 201 mounts the removable HDD 206 in the software and loads further start-up data from the removable HDD 206. In step S307, the CPU 201 starts the OS with the use of the start-up data loaded from the incorporated HDD 205 in step S304 and the start-up data loaded from the removable HDD 206 in step S306. In step S308, an application necessary for causing the image forming apparatus 100 to operate is loaded and launched. In step S309, the CPU 201 generates image data for informing the user that an application has been started during an operation of the image forming apparatus, and transmits the image data to the display controller 105 to be displayed by the display unit 106. The image data generated in this embodiment may be, for instance, an operation screen that displays an application menu or the like. This is the normal start-up processing of the image forming apparatus 100.

Meanwhile, when the CPU 201 confirms in step S305 that the shutdown flag is ON (1), the process proceeds to step S310 where the CPU 201 starts an OS, which is different from the normal start-up in step S307, only with the use of the start-up data loaded in step S304 from the incorporated HDD 205. In step S311, the CPU 201 generates image data for informing the user that the image forming apparatus has been started without the use of the removable HDD 206, and transmits the image data to the display controller 105 to be displayed by the display unit 106.

As has been described above, sometimes there is a reason that the image forming apparatus 100 cannot immediately be shut down when shutdown is instructed. In such a case (in the present embodiment, a case where cooling is necessary in the print mechanism), conventionally the shutdown processing cannot be completed until the reason is dealt with, and during this time period, the removable HDD 206 cannot be removed. However, according to the present embodiment, even if there is a reason that the image forming apparatus cannot be immediately shut down, the apparatus is forcibly shut down once without waiting for the reason to be dealt with. Thereafter, at the time of start-up, the start-up processing is performed without using start-up data stored in the removable HDD 206. Therefore, the user can forcibly perform shutdown, and can remove the removable HDD 206 immediately. Furthermore, even in a case of start-up after the removable HDD 206 is removed by a user, because cooling of the print mechanism 103 is resumed, the possibility of causing deterioration or damage in the print mechanism 103 can be reduced.

Second Embodiment

In the first embodiment, for a reason that the print mechanism 103 cannot be immediately shut down, cooling the print mechanism 103 is given as an example. Also in the case of cleaning the print mechanism 103, a similar flow can be employed. A difference between the first and second embodiments is whether it is "cooling" or "cleaning" of the print mechanism 103. Therefore, the series of processing flow is the same.

As described above, according to the second embodiment, even in a case where a user instructs to shut down the image forming apparatus 100 but the removable HDD 206 cannot be immediately removed, the apparatus is forcibly shut down once without waiting for the reason to be dealt with. Thereafter, the apparatus is restarted in a state that does not use the removable HDD 206. Accordingly, the user can immediately remove the removable HDD 206. In such a case, even if the removable HDD 206 is removed, because cleaning of the print mechanism 103 is performed after the start-up, high-precision printing can be maintained.

Third Embodiment

In the first embodiment, for a reason that the print mechanism 103 cannot be immediately shut down, cooling the print mechanism 103 is given as an example. Also in a case of errors occurred in the print mechanism 103, such as paper jam, a similar flow can be employed. Only a difference between the first and third embodiments is described below.

In the third embodiment, after start-up processing is performed according to the shutdown flag, the image forming apparatus returns to the state before the shutdown processing, with the use of the data that has been evacuated in the incorporated HDD 205 of the image forming apparatus main unit. The state before the shutdown processing is a state where printing has stopped because of an error in the print mechanism 103. If an error, such as paper jam, is resolved by a maintenance worker or user, the print mechanism 103 can be shut down. In this stage, the CPU 201 recognizes an error of the print mechanism 103 in step S111 in FIG. 3, and informs the user of the error state in step S114. If the error factor is eliminated by a user or maintenance worker (YES in step S111), shutdown can be performed. Alternatively, when an error factor is eliminated, printing may be resumed.

As described above, according to the third embodiment, a user can remove the removable HDD 206 regardless of an error in the print mechanism 103. When repair or the like of the print mechanism 103 is performed, it is unnecessary to leave behind, for repair, the removable HDD 206 attached to the image forming apparatus, which stores important data. Furthermore, because the removable HDD 206 can be immediately removed, a user does not have to be present beside the image forming apparatus at the time of repair. As a result, repair that has conventionally been performed only in the daytime, because a user needs to be present, can be performed at night, and thus the operation rate of the image forming apparatus 100 in the daytime can be increased.

Fourth Embodiment

The first embodiment has described that, if the shutdown flag is ON at the time of restart (YES in step S305 in FIG. 5), the OS start-up (step S310) performed by the CPU 201 is executed only with the use of data loaded from the incorporated HDD 205 (or non-volatile memory 204) to the memory 202. However, there may be a case that data stored in the incorporated HDD 205 is insufficient for starting the OS. In this case, start-up data from a network can be loaded to the memory 202. The start-up processing according to the fourth embodiment is described with reference to FIG. 6. Note that, since steps S401 to S409 and S413 are identical to aforementioned steps S301 to S309 and S311 in FIG. 5, a description thereof is omitted.

Figure 6:
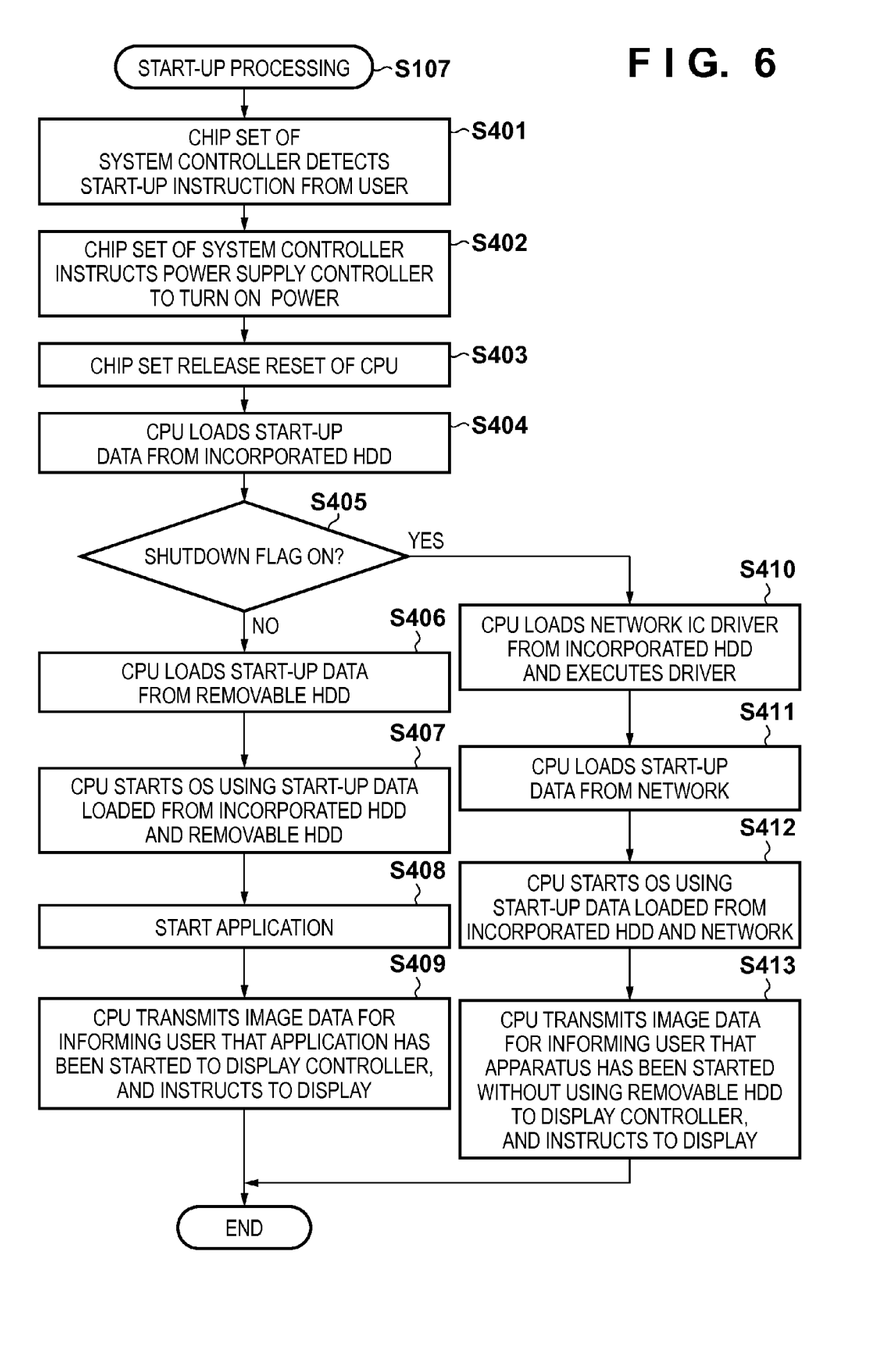
FIG. 6 is a flowchart for describing a detailed processing procedure of start-up processing according to the fourth embodiment.

A difference between the first and fourth embodiments is steps S410 to S412 in the flowchart in FIG. 6. When the CPU 201 recognizes a shutdown mode, in step S410, the CPU 201 loads a network IC driver from the incorporated HDD 205 to the memory 202 for execution. As a result, the CPU 201 can access a network through the chip set 203 and the network IC 213. In step S411, the CPU 201 loads OS start-up data from a server (not shown) in the network to the memory 202. In step S412, the CPU 201 launches the OS with the use of both the start-up data loaded from the incorporated HDD 205 to the memory 202 in step S404 and the start-up data loaded to the memory 202 via the network in step S412. The subsequent processing is the same as that of the first embodiment.

According to the fourth embodiment, because the CPU 201 loads an OS to be started in a removed state of the removable HDD 206 to the memory 202 via the network, the incorporated HDD 205 has no capacity limitations. The incorporated HDD 205 is a non-removable HDD, and generally a small-capacity HDD is provided in a substrate. Because OS start-up data can be loaded to the memory 202 via a network in the fourth embodiment, it is possible to start up an OS having no less function than an ordinary OS. Accordingly, compared to the first embodiment, operation contents of the CPU 201 can be improved during cooling of the print mechanism 103, and it becomes possible to improve a display content of the display unit 106.

As a matter of course, the fourth embodiment is applicable not only to the first embodiment, but also to the second and third embodiments.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-094373, filed Apr. 20 2011, and No. 2012-084702, filed Apr. 3, 2012, which are hereby incorporated by reference herein in their entirety.

What is claimed is:

1. An image forming apparatus capable of connecting a removable storage device that stores operation data controlling an operation of the image forming apparatus, the apparatus comprising:
a non-volatile storage unit configured to store operation data for controlling an operation of the image forming apparatus;
a determination unit configured to determine, in a case that a shutdown instruction of the image forming apparatus is received from a user, whether or not it is necessary to execute an operation using the operation data stored in the removable storage device;
a restarting unit configured to save the operation data stored in the removable storage device into the non-volatile storage unit and to shut down the image forming apparatus after the operation data stored in the removable storage device has been stored in the non-volatile storage unit, in a case that it is determined by the determination unit that it is necessary to execute the operation using the operation data stored in the removable storage device, and then restart the image forming apparatus; and
a control unit configured to control so that, after a restart is performed by the restarting unit, if the determination unit has determined that the operation using the operation data stored in the removable storage device is necessary to execute, the operation using the operation data stored in the non-volatile storage unit is executed.

2. The image forming apparatus according to claim 1, further comprising a print mechanism, wherein the operation data includes data for cooling the print mechanism, data for cleaning the print mechanism, or data for eliminating an error factor of the print mechanism.

3. The image forming apparatus according to claim 1, wherein the restarting unit starts the image forming apparatus based on operation data inputted through a network.

4. The image forming apparatus according to claim 1, further comprising an informing unit that informs a user that, after a restart is performed by the restarting unit, the removable storage device can be removed.

5. The image forming apparatus according to claim 1, wherein, in a case that it is determined by the determination unit that it is necessary to execute the operation using the operation data stored in the removable storage device, the restarting unit stores information indicating that it is necessary to execute the operation using the operation data into the non-volatile storage unit, and
after a restart is performed by the restarting unit, the control unit controls to execute an operation using the operation data stored in the non-volatile storage unit, in a case in which the information is stored in the non-volatile storage unit.

6. A control method of an image forming apparatus, having a non-volatile storage unit configured to store operation data for controlling an operation of the image forming apparatus, capable of connecting a removable storage device that stores operation data controlling an operation of the image forming apparatus, the method comprising:
determining, in a case that a shutdown instruction of the image forming apparatus is received from a user, whether or not it is necessary to execute an operation using the operation data stored in the removable storage device;
saving the operation data stored in the removable storage device into the non-volatile storage unit and shutting down the image forming apparatus after the operation data stored in the removable storage device has been stored in the non-volatile storage unit, in a case that it is determined that it is necessary to execute the operation using the operation data stored in the removable storage device, and then restarting the image forming apparatus; and
controlling so that, after a restart is performed if it is determined that the operation using the operation data stored in the removable storage device is necessary to execute, the operation using the operation data stored in the non-volatile storage unit is executed.

* * * * *